United States Patent
Coric

(10) Patent No.: US 6,213,311 B1
(45) Date of Patent: Apr. 10, 2001

(54) FILTER HAVING A DEVICE FOR COUNTERING THE CLOGGING OF THE FILTER

(75) Inventor: Philippe Coric, Orvault (FR)

(73) Assignee: E.I.F., Montreuil sous Bois (FR)

( * ) Notice: Subject to any disclaimer, the term of this patent is extended or adjusted under 35 U.S.C. 154(b) by 0 days.

(21) Appl. No.: 09/160,585

(22) Filed: Sep. 25, 1998

(30) Foreign Application Priority Data

Sep. 26, 1997 (FR) .................................................. 97 12029

(51) Int. Cl.$^7$ .................................................. B01D 33/54

(52) U.S. Cl. ........................... 210/384; 210/85; 210/388; 55/292

(58) Field of Search ..................................... 210/384, 388, 210/321.67, 785, 103, 412, 319, 323.3, 780, 332, 748, 339, 85, 106; 55/292, 287, DIG. 24; 95/282, 29; 29/594

(56) References Cited

U.S. PATENT DOCUMENTS

| | | | | |
|---|---|---|---|---|
| 4,028,232 | * | 6/1977 | Wallis | 210/785 |
| 4,253,962 | * | 3/1981 | Thompson | 210/414 |
| 4,282,100 | * | 8/1981 | Kunishio et al. | 210/384 |
| 4,753,257 | * | 6/1988 | Gabriel et al. . | |
| 4,861,494 | * | 8/1989 | Bratten | 210/739 |
| 4,946,602 | * | 8/1990 | Ekberg et al. | 210/785 |
| 5,059,331 | * | 10/1991 | Goyal | 210/748 |
| 5,085,772 | * | 2/1992 | Busch-Sorenson | 210/388 |
| 5,102,534 | * | 4/1992 | Gabet | 210/90 |

* cited by examiner

Primary Examiner—W. L. Walker
Assistant Examiner—Marianne S. Ocampo
(74) Attorney, Agent, or Firm—Young & Thompson

(57) ABSTRACT

A filter having a device for countering the clogging of the filter for a fluid, in particular a liquid, includes a filtering element arranged in a filter cavity bounded by an outer casing, an ultrasound emitter coupled into the cavity, in the direction of the filtering element, in order to prevent the filtering element from becoming clogged during operation of the filter.

15 Claims, 2 Drawing Sheets

FILTER HAVING A DEVICE FOR COUNTERING THE CLOGGING OF THE FILTER

BACKGROUND OF THE INVENTION

The invention relates to a device for countering the clogging of a filter for a fluid, in particular a liquid.

DESCRIPTION OF THE RELATED ART

For a large number of existing filters, the problem arises that the filtering elements become clogged by particles, which substantially reduces the capacity of the filter during its operation.

In order to remedy this loss of capacity, it is necessary to schedule regular maintenance operations, during which the clogged filtering element is replaced or the filtering element is cleaned by external means.

However, these regular maintenance operations occur at frequent intervals, and on every occasion they lead to a temporary shut down of the filtering process and therefore a shut down of the plant of which the filter forms a part, and this has an unfavourable effect on the operating cost of this plant.

SUMMARY OF THE INVENTION

The object of the invention is to overcome this drawback by providing a device for countering the clogging of a filter which allows the filtering performance of the filter to be improved substantially, in particular in the long term, by reducing the frequency at which the maintenance operations occur on account of clogging of the filtering element.

To this end, the invention relates to a device for countering the clogging of a filter for a fluid, in particular a liquid, having a filtering element arranged in a filter cavity bounded by an outer casing, characterized in that it comprises at least one ultrasound emitter and associated means for coupling the ultrasound emitted by the emitter into the said cavity, in the direction of the filtering element, in order to prevent the filtering element from becoming clogged during operation of the filter.

The filtering device according to the invention may furthermore include one or more of the following characteristics:

- the ultrasound emitted by each emitter has a frequency of between 30 and 50 kHz, and in particular 40 kHz,
- the emission power of each emitter is in excess of 100 W, in particular between 100 W and 400 W, or in excess of 600 W,
- for each ultrasound emitter, the coupling means comprise an oscillating mass which is interposed between the ultrasound emitter and the cavity, and which is acoustically tuned with respect to the geometry of the cavity and that of the filtering element,
- the oscillating mass is made of metal,
- each oscillating mass surrounds the filter and is in intimate contact with it,
- for one oscillating mass, it includes at least two ultrasound emitters arranged on both sides of the filter,
- each oscillating mass includes a passage intended to form the outer casing of the filter,
- each oscillating mass includes a passage intended to contain the outer casing of the filter,
- a transfer medium, in particular a grease, is provided between the oscillating mass and the outer casing of the filter,
- in the case when the filter is a filter for tangentially filtering a liquid, the outer casing of which is formed by a tube, and the filtering element of which has a tubular shape and is arranged substantially coaxially in the tube so as to divide the cavity into a central part, through which the liquid to be filtered passes, and a peripheral part for accumulation of filtrate, a filtrate outlet being formed in the wall of the casing, the device for countering clogging includes at least two ultrasound emitters and two associated means for coupling the ultrasound emitted by the emitters into the cavity, the emitters and the associated coupling means being arranged respectively on either side of the filtrate outlet,
- the emission direction of each emitter is oriented perpendicular to the longitudinal axis of the outer casing and of the filtering element,
- each oscillating mass surrounds the outer casing of the filter and includes at least one recess extending in a longitudinal plane containing the axis of the filter, perpendicular to the emission direction of the corresponding emitter, in order to concentrate the intensity of the ultrasound at the filtering element,
- it furthermore comprises a unit for intermittently activating each emitter,
- it comprises a sensor for measuring the degree to which the filtering element is clogged, means for comparing the measured degree of clogging with a predefined threshold, which activate the said at least one ultrasound emitter when the degree to which the filtering element is clogged exceeds a predefined threshold,
- the sensor for measuring the degree to which the filtering element is clogged is a flow meter for measuring the flow rate of the filtrate obtained.

The invention also relates to a filtering device comprising a filter for a fluid, in particular a liquid, having a filtering element arranged in a filter cavity bounded by an outer casing, characterized in that it furthermore comprises a device for countering clogging of the filter defined above.

BRIEF DESCRIPTION OF THE DRAWINGS

The invention will be understood more clearly from the following description which is given solely by way of example and with reference to the appended drawings, in which.

DESCRIPTION OF THE PREFERRED EMBODIMENTS

Figure 1:
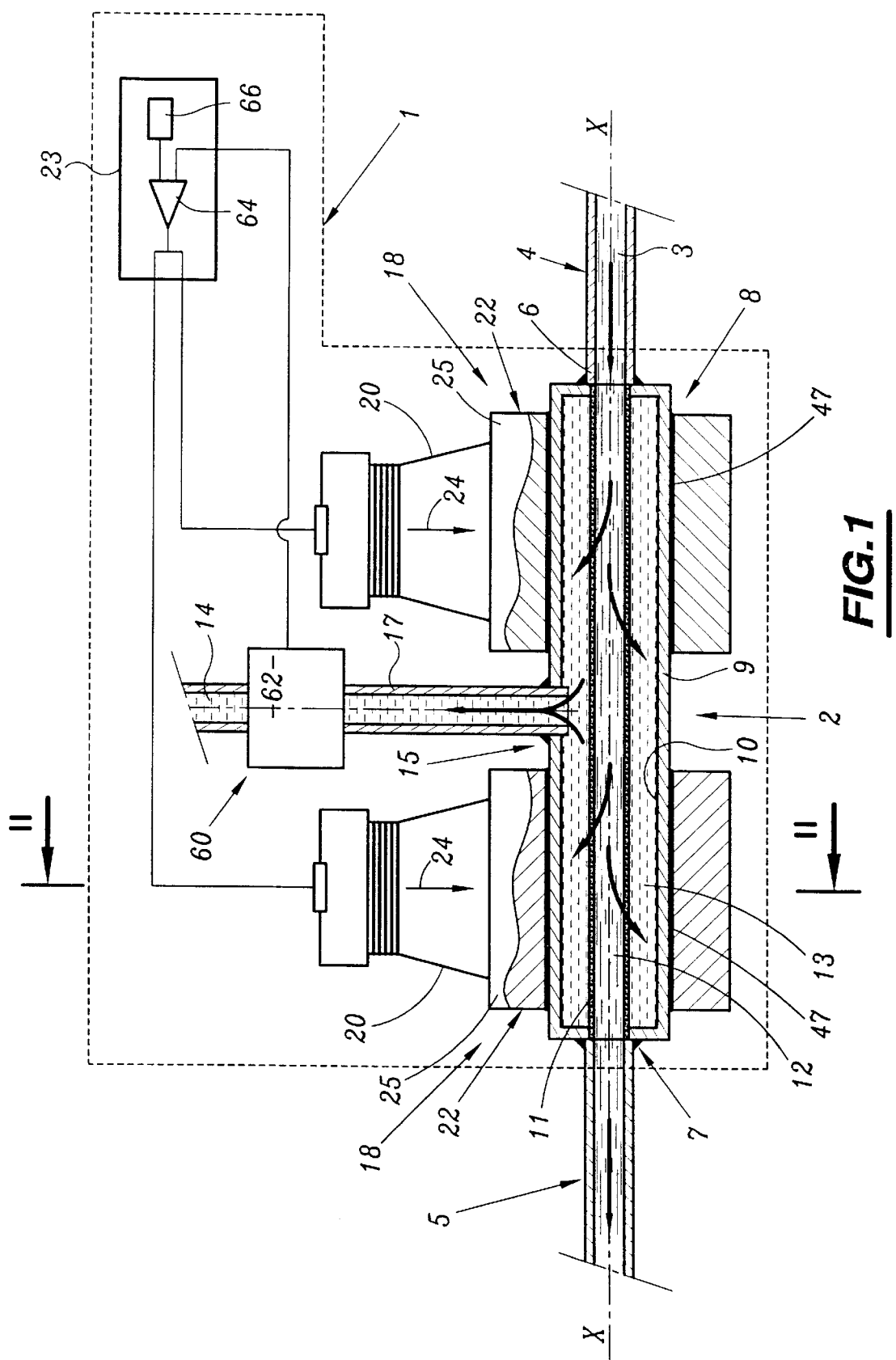
FIG. 1 is a partial sectional view of a filtering device according to the invention.

FIG. 1 represents a diagram of a device 1 for filtering a fluid, in particular a liquid, according to a first illustrative embodiment.

This device 1 comprises a tangential-filtration filter 2 arranged in a loop circuit of a liquid 3 to be filtered, of which only the inlet 4 and discharge 5 ducts, respectively connected to an inlet 6 and an outlet 7 of the filter 2 for the liquid 3 to be filtered, are represented.

The filter 2 comprises an outer casing 8 formed by a tube 9 which is of circular cross-section and bounds a filter cavity 10.

Figure 2:
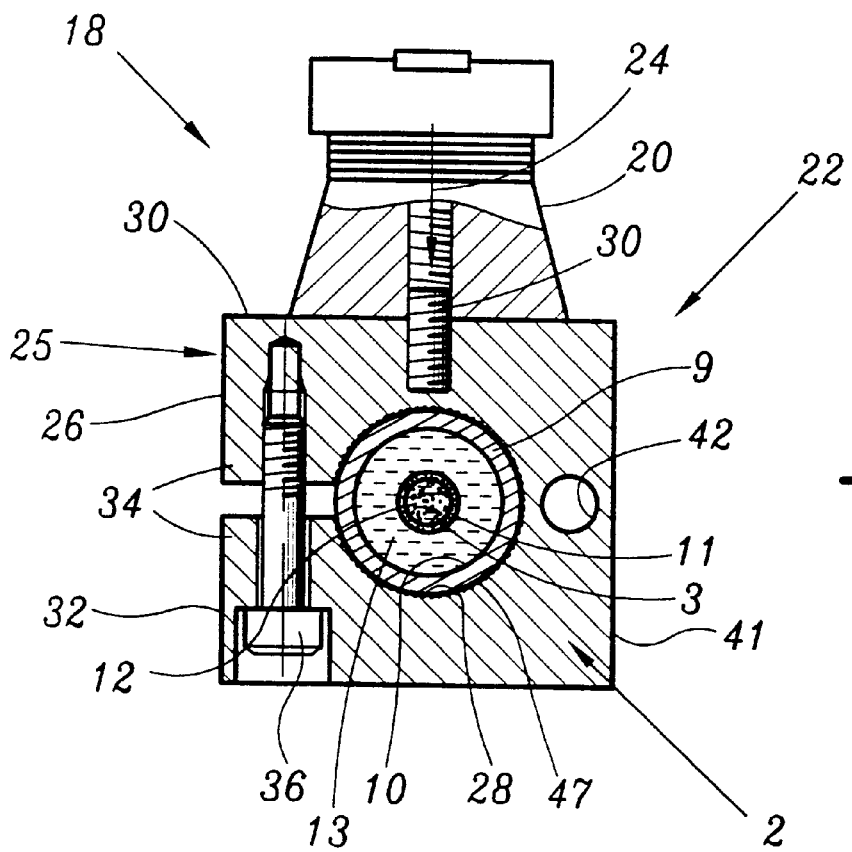
FIG. 2 is a schematic view in section on the line II—II in FIG. 1.

A filtering element 11 of tubular shape is fixed substantially coaxially inside the tube 9, in the cavity 10. As seen in FIG. 2, this filtering element 11 divides the cavity 10 into a central part 12, in which the liquid 3 to be filtered flows, and a peripheral part 13, in which the liquid 3 accumulates after having passed through the filtering element 11, in the form of a filtrate 14.

As represented in FIG. 1, a filtrate outlet 15 is arranged half-way along the tube 9, in its outer casing 8, and is connected to a duct 17 for discharging the filtrate 14.

In order to prevent the filtering element 11 from becoming clogged, the filtering device 1 furthermore comprises a device 18 for countering clogging of the filtering element 11. This device 18 for countering clogging of the filtering element 11 comprises two ultrasound emitters 20, respectively arranged on either side of the filtrate outlet 15, on the outer casing 8, using associated means 22 for coupling the ultrasound emitted by the emitters 20 into the cavity 10, in the direction of the filtering element 11.

The emitters 20 are of the piezoelectric or magnetostrictive type, and are connected to a common activation unit 23.

By way of example, the ultrasound emitted by each emitter 20 has a frequency of between 30 kHz and 50 kHz, and particularly 40 kHz, and the emission power of each emitter 20 is in excess of 100 W, in particular between 100 and 400 W, or in excess of 600 W.

In addition, the emission direction of the emitters 20, indicated by an arrow 24, is substantially perpendicular to the longitudinal axis X—X of the tube 9 and of the filtering element 11.

For each emitter 20, the coupling means 22 comprise an oscillating mass 25, preferably made of metal. The term "oscillating mass" is intended to mean a mass which oscillates when it is subjected to ultrasound, and which absorbs substantially none of the acoustic energy emitted by the emitters 20, in order to permit efficient transmission of the acoustic waves to the filter 2.

As seen in FIG. 2, an oscillating mass 25 of this type is formed by a metal block 26 which has a square cross-section and on an outer face 30 of which the emitter 20 is fixed, for example using a screw 30, and which comprises a central passage 28 of circular section, designed to allow the block 26 to be fitted over the outer casing 8 so that it surrounds the filter 2.

Further, in order to ensure intimate contact between the block 26 and the casing 8, the block 26 is slit on one side 32 adjacent to the face 30 so as to form clamping jaws 34, and also comprises a screw 36 for tightening these jaws 34.

On the other side 41 from the jaws 34, a through-hole 42, extending parallel to the jaws 34, is formed in the block 26 in order to balance the mass distribution of the block 26 so as to render the transmission of ultrasound to the filtering element 11 uniform.

Furthermore, a transfer medium 47, for example a grease, is interposed between the block 26 and the outer casing 8 in order to improve the acoustic coupling between them.

The dimensions of the block 26 are chosen in such a way that it is acoustically tuned, in particular with respect to the geometry of the cavity 10 and that of the filtering element 11.

Figure 3:
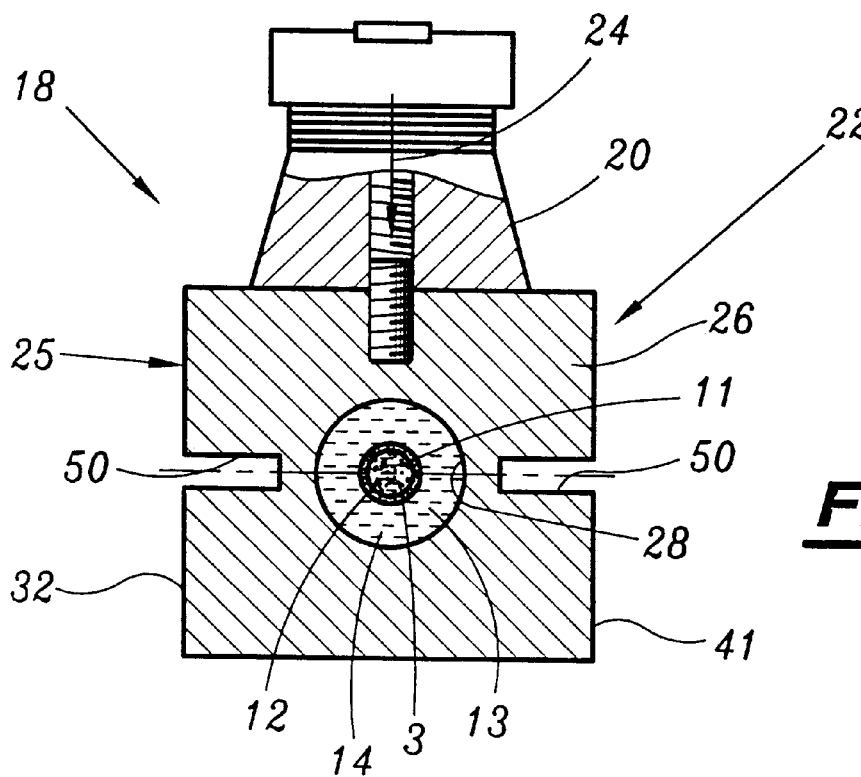
FIG. 3 is a view, identical to the one in FIG. 2, of a variant of the device according to the invention.

According to a variant of the device 18 for countering clogging, which is represented in FIG. 3, the oscillating mass 25 formed by the metal block 26 is part of the outer casing 8 of the filter 2.

In this case, the wall of the central passage 28 in the block 26 serves as the outer casing 8 of the filter 2.

In addition, in order to concentrate the intensity of the ultrasound at the filtering element 11, the block 26 includes, on each side of the cavity 10, on its sides 32 and 41 and instead of the jaws 34 and the through-hole 42, respectively a recess 50 in the form of a groove extending in a longitudinal central plane of the filter 2, perpendicular to the emission direction 24 of the emitter 20.

With reference to FIG. 1, the device 1 furthermore comprises a sensor 60 for measuring the degree to which the filtering element 11 is clogged. This sensor 60 is formed by a flow meter 62 installed in the filtrate discharge duct 17 and is connected to the activation unit 23 of the emitters 20.

The activation unit 23 comprises means 64 for comparing the flow rate measured by the flow meter 62 with a predefined minimum threshold value recorded in a memory 66.

The output of the comparison means 64 is connected to each of the emitters 20.

The filtration device 1 according to the invention operates as follows.

During operation of the filter 2, a negative pressure is applied to the discharge duct 17 so that the liquid 3 to be filtered passes through the filtering element 11 and is then discharged in the form of the filtrate 14.

During the filtration, the flow meter 62 regularly records the flow rate of the filtrate 14 obtained, and transmits this flow rate to the comparison means 64.

The increase in the degree of clogging is manifested by a drop in the recorded flow rate. When the degree to which the filtering element 11 is clogged exceeds the predetermined threshold, that is to say when the flow rate of the filtrate 14 obtained falls below a certain threshold, the comparison means 64 send an activation signal to the ultrasound emitters 20.

The emitters 20 then emit ultrasound, which is acoustically coupled using the blocks 26 and the liquid 3 flowing in the cavity 10, in particular from the filtrate 14 found in the peripheral part 13, to the filtering element 11 and eject the particles deposited inside and on the inner wall of the filtering element 11. The particles are then carried away again by the liquid 3 to be filtered and no longer obstruct the active surface of the filtering element.

The filter thus rapidly returns to its original filtering efficiency without it being necessary to shut down the filtering. It can therefore be seen that the filtration device 1 permits continuous operation, and does so under optimum filtering conditions.

In a simplified variant of the filtering device, it is proposed to omit the flow meter 62 and produce the unit 23 in the form of a unit which intermittently activates each emitter 20, in order to activate the emitters 20 for a specific period at predefined time intervals.

In a basic version, of course, it is proposed to operate the ultrasound emitters 20 continuously.

According to another variant of the device, it is proposed to fix two ultrasound emitters 20 on respectively opposite faces of the same metal block 26, as they are represented in FIGS. 2 and 3.

Furthermore, the invention also applies to filters for head-on filtration, if the emission frequency and the power of the ultrasound emitters are adapted to the new geometry, in particular to that of the outer casing of the filter and to that of its filtering element.

In the case of head-on filtration, the filtration performance of the device according to the invention is improved greatly in comparison with known filters of the same type, and the maintenance operations to flush the particles retained by the filter occur at much longer time intervals.

Furthermore, the device 18 for countering clogging can be mounted with ease on existing filters in order to form a filtering device 1.

What is claimed is:

1. A filtering device comprising:
    an outer casing (8) having an axis and defining a filter cavity (10) therein;
    a filtering element (11) arranged in said cavity;
    at least one ultrasound emitter (20) arranged for emitting ultrasound substantially perpendicularly to said axis; and
    a metal oscillating mass (25) coupling said emitter and said cavity by being fixedly interposed between said emitter and said cavity,
    said oscillating mass including a passage (28) which contains said outer casing and surrounds said casing in intimate contact with said casing.

2. Device according to claim 1, wherein emission power of each emitter (20) is in excess of 100 W.

3. Device according to claim 2, wherein the emission power is between 100 W and 400 W.

4. Device according to claim 2, wherein the emission power is in excess of 600 W.

5. Device according to claim 1, wherein the ultrasound emitted by each emitter (20) has a frequency of between 30 and 50 kHz.

6. Device according to claim 5, wherein the frequency is 40 kHz.

7. Device according to claim 1, wherein a transfer medium is provided between said oscillating mass (25) and said outer casing (8).

8. Device according to claim 7, wherein said transfer medium is a grease.

9. Device according to claim 1, further comprising a sensor (60) for measuring the degree to which the filtering element (11) is clogged, means (64) for comparing the measured degree of clogging with a predefined threshold, which activate the said at least one ultrasound emitter (20) when the degree to which the filtering element (11) is clogged exceeds a predefined threshold.

10. Device according to claim 9, wherein the sensor (60) for measuring the degree to which the filtering element (11) is clogged is a flow meter (62) for measuring a flow rate (14) of filtrate obtained.

11. Device according to claim 1, wherein said oscillating mass is acoustically tuned with respect to a geometry of said cavity (10) and a geometry of said filtering element (11).

12. Device according to claim 1, further comprising a fluid filter (2) having the filtering element (11) arranged in the filter cavity (10) and bounded by the casing (8).

13. Device according to claim 12, wherein the fluid filter (2) is a filter for tangentially filtering a liquid (3), said filtering element (11) having a tubular shape and being arranged substantially coaxially in said cavity (10) so as to divide said cavity (10) into a central part (12) through which the liquid (3) to be filtering is made to pass, and a peripheral part (13) for accumulation of filtrate (14), a filtrate outlet (15) being formed in a wall of said casing (8), said device including at least two said ultrasound emitters (20) and two respective said oscillating masses (25), said emitters (20) and said respective masses (25) being arranged respectively on either side of said filtrate outlet (15).

14. Device according to claim 1, wherein said oscillating mass (26) includes at least one recess (50) extending in a longitudinal plane containing said axis (X—X) and perpendicular to an emission direction (24) of the corresponding emitter (20), in order to concentrate intensity of the ultrasound at the filtering element (11).

15. Device according to claim 1, further comprising a unit (23) for intermittently activating each emitter (20).

* * * * *